May 31, 1932.  C. E. CHESNEY  1,861,262
VEHICLE BROADCASTING RECEIVER UNIT AND GENERATOR THEREFOR
Filed Oct. 19, 1931
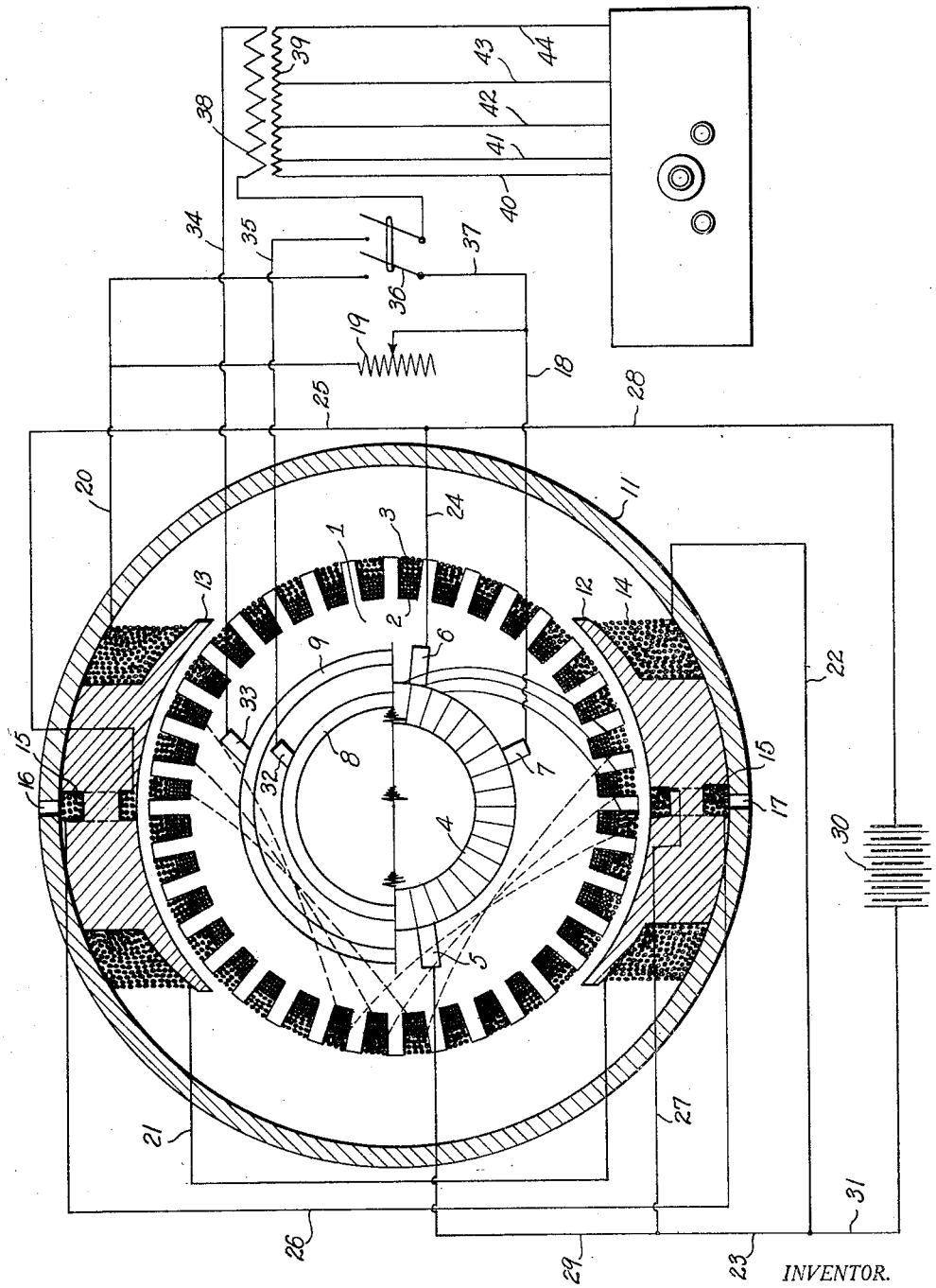
INVENTOR.
Carl E. Chesney
BY Thos. E. Scofield
ATTORNEY.

Patented May 31, 1932

1,861,262

UNITED STATES PATENT OFFICE

CARL E. CHESNEY, OF OVERLAND PARK, KANSAS, ASSIGNOR TO ROY THORP, OF KANSAS CITY, MISSOURI, AS TRUSTEE

VEHICLE BROADCASTING RECEIVER UNIT AND GENERATOR THEREFOR

Application filed October 19, 1931. Serial No. 569,775.

My invention relates to a unit for installation on vehicles for receiving radio broadcasting and more particularly for a unit for use on automobiles and aeroplanes. My invention contemplates the employment of a novel generator in combination with a broadcasting receiver or other thermionic tube device on an automobile.

It has become popular of late to install radio receiving sets on automobiles. Due to the fact that the only source of potential on an ordinary automobile is a six-volt direct current generator, which normally charges a six-volt storage battery, it is necessary to use batteries as a source of plate potential. Battery receiving sets, except in this connection, are rapidly becoming obsolete, due to the fact that there has been such a rapid advance in the art. Modern sets employ substantially exclusively alternating current tubes and sets of this character have manifest advantages. The alternating current tube sets are largely used in the homes. These sets which use alternating current tubes cannot be employed on an automobile due to the fact that there is no source of alternating potential.

One object of my invention is to provide a vehicle broadcasting receiver unit which will enable the use of an alternating current receiver.

Another object of my invention is to provide a source of potential which will give both alternating current and direct current.

A further object of my invention is to provide a constant potential generator. It is well known that one of the chief difficulties and obstacles to a unit using a generator as a source of potential in an automobile to operate a radio receiver is the fact that the motor speeds in an automobile vary greatly.

A still further object of my invention is to provide a source of potential which is substantially constant regardless of variations in speed.

Another object of my invention is to provide a means for compensating for the cross magnetizing effect which would result from the alternating current windings when the external circuit thereto is completed.

The figure shows a diagrammatic sketch illustrating one embodiment of my invention.

In general, my invention contemplates a generator having an armature, in the slots of which are disposed both alternating current and direct current windings. The armature is provided with both a commutator for the direct current component and collecting rings for the alternating current component. I provide pole pieces of novel construction on which are wound two pairs of field windings at right angles to each other. One of these field windings is connected across the main direct current brushes. I provide a third brush in addition to the two main brushes for the commutator. The main field winding is connected to the third brush and one of the main brushes. The action of the field windings gives a constant voltage at variable speeds, as will be hereinafter more fully described. I provide a transformer, the secondary coil of which is tapped to form a power pack for supplying potential to a thermionic tube device such as a radio receiver or amplifier. Normally, the main field windings have a variable resistance interposed in series in the main field circuit. I provide means for automatically shunting this resistance when the external circuit is closed in order to increase the strength of the main field for a purpose which will be hereinafter more fully described.

Referring now to the drawings, more particularly, my invention consists in an armature 1, provided with the customary slots 10. Alternating current windings 2 are disposed in the base of these slots. Direct current conductors 3 are superposed upon the alternating current windings in the slots. The purpose of so disposing the windings will hereinafter appear. Commutator 4 of the direct current portion of my generator has a leading main brush 6, a trailing main brush 5, and a third brush 7. Collector rings 8 and 9 having brushes 32 and 33 are provided for collecting alternating current. The stator casing 11 supports pole pieces 12 and 13 on which are wound main field windings 14. At right angles to the main field winding are cross field windings 15. This cross field will be hereinafter referred to as the regulating field. Air gaps 16 and 17 are provided in the stator casing in the vicinity of the regulating field winding in order to increase the magnetic reluctance in the outward direction. As can be understood, the magnetic field set up by regulating field windings 15 will be distorted inwardly, throwing the field in a direction where it will have a greater effect.

Normally the circuit through the main field is from the third brush 7 through conductor 18, through variable resistance 19, through conductor 20, through south pole piece winding 14 which is placed in series with north pole piece winding 14 through conductor 21, through conductor 22, conductor 23, conductor 29, to trailing main brush 5. By varying the field resistance 19, a suitable potential may be obtained for general use in an automobile for the customary purposes such as charging the battery and ignition.

The circuit through the regulating field is from leading main brush 6, through conductor 24, through conductor 25, through regulating field 15 on the south pole piece 13, which is placed in series with the regulating field 15 on the north pole piece 12 by conductor 26, through conductor 27, through conductor 29 to the trailing main brush 5.

As can be seen, the battery charging current leaves the commutator through leading main brush 6, through conductors 24 and 28, to the battery 30. The return circuit is through conductors 31, 23 and 29 to trailing main brush 5.

The alternating current potential is picked up from collector rings 8 and 9 by brushes 32 and 33 and led through conductors 34 and 35. Normally there is no alternating current load on my generator. When it is desired, for example, to operate a radio receiver, the switch 36 is closed. The alternating current then flows through conductors 34 and 35, through the primary 38 of the power transformer. The secondary 39 of the power transformer has suitable caps 40, 41, 42, 43, and 44 which supply potential to the thermionic tube device which may be a radio receiver employing alternating current tubes or an amplifier for use with the phonographic pickup tubes. It is obvious that the source of alternating current potential may be used for other purposes such as the operation of neon tube signs or devices in which high voltage alternating current is employed. These devices could not hitherto be used on automobiles without resort to a rotary converter or motor generator set.

When a load is thrown on the alternating current circuit, the current in the alternating current windings of my generator sets up a cross field, the resulting cross magnetic effect of which tends to shift the field. When this occurs, it will result in a decrease in the voltage. To minimize this effect I have placed my alternating current windings in the bottom of the slots inasmuch as this will lengthen the path of the magnetic flux set up by the current in the alternating current windings. In order to resist the tendency for the field to shift and in order to increase the voltage generated, it is desirable to strengthen the main field. Accordingly I provide means which will automatically increase the strength of the main field when the alternating current load is thrown in. I do this by using a double pole switch 36, one blade of which throws in the alternating current load and the other blade of which shunts out the resistance 19 through conductor 37, thus allowing a greater current to flow through the main field windings 14 whenever the alternating current component of the generator is in use.

The use of the third brush for regulating the potential of the generator is well known in the art. In practice, when it is desired to increase the voltage, the third brush is shifted in the direction of rotation. When it is desired to decrease the voltage, the third brush is shifted against the direction of rotation. It will be noted that the main field 14, being disposed at right angles to regulating field 15 will give a resultant field the direction of the magnetic vector of which is determined by the respective strengths of the fields. It is obvious that if we increase the strength of the field 15, the resultant field will shift. I have disposed the circuits so that an increase in the regulating field current will shift the field in the direction of rotation. It is obvious that shifting the field in the direction of rotation is the equivalent of moving the third brush against the direction of rotation. Thus, let us assume that the generator is running at a given speed and producing a given voltage. If the speed of the armature should be increased, the immediate effect would be a strengthening of the regulating field inasmuch as this field is connected directly across the main brushes 5 and 6. The resultant field will then have the direction of its vector shifted in the direction of rotation. This will give the same effect as shifting the third brush 7 against the direction of rotation. As will be apparent, this will result in a decrease in the strength of the main field 14, which will result in a lower generated voltage than would normally be the case at the increased speed. Likewise, a decrease in the armature speed will result in an immediate decrease of the regulating field, giving the effect of shifting the third brush in the direction of rotation and thus increasing the strength of the main field. This will maintain the voltage at the lower speed. It is believed that the regulating action of my generator will be understood from the foregoing description. It is in effect an automatic regulation of the strength of the main field by what amounts to a constant movement of the third brush in effect.

Thus it is seen that I have provided a unit which may be used in an automobile to receive radio broadcasting without the aid of batteries. My device has the advantage of permitting the employment of alternating current tube equipment. This makes it possible for the user to use the same receiving set both in the home and in the automobile. Programs may be broadcast from a vehicle equipped with the device of my invention for advertising purposes, inasmuch as sufficient volume may be easily obtained without resort to cumbersome batteries. Phonographic pickup devices using thermionic tube amplifiers employing alternating current tubes may be installed on automobiles for broadcasting advertising programs.

It is to be remembered that the essential feature of a device of this nature is its ability to maintain a constant voltage. If this is not obtained, the mere fact that both direct and alternating current are generated will not enable a generator to be used in this connection. For example, a machine in which a shunt field is established from the storage battery and the output of the direct current armature used to excite the field of an alternating current generator, the violent surges of current through the alternating current generator field due to speed changes will render the device inoperative for radio purposes. Furthermore, in a machine of the kind employing the cascade principle of using the direct current output to excite the alternating current field cannot be used to charge the battery or for ignition purposes while the radio equipment is being employed. In a very short period of time, the storage battery which has been made to furnish current for ignition and light purposes runs down. It will be seen that the device of my invention has none of the foregoing disadvantages and is an operative machine. Vehicles equipped with my device have been operated continuously for a period of several months with complete success.

It is to be understood that certain features and sub-combinations are of utility and may be employed without reference to other features and sub-combinations. That is contemplated by and is within the scope of my claims. It is further obvious that various changes may be made in the details within the scope of my claims without departing from the spirit of my invention. It is, therefore, to be understood that my invention is not to be limited to the specific details shown and described.

Having thus described my invention, what I claim is:

1. The combination, with a generator comprising an armature, an alternating current winding on said armature, a direct current winding on said armature, a commutator, collecting rings, a pair of main brushes for collecting direct current from said commutator, a third brush, pole pieces, a main field winding on said pole pieces, a regulating field winding disposed at right angles to said main field, the main field winding being connected across said third brush and one of said main brushes, the regulating field winding being connected across said main brushes, and a variable resistance in series with said main field circuit; of a transformer, a thermionic tube device using power supplied by said transformer, means for connecting said transformer to the alternating potential generated by said alternating current winding, and means for automatically strengthening said main field of the generator, when said connecting means is actuated.

2. The combination, with a generator comprising an armature, and alternating current windings on said armature, a direct current winding on said armature, a commutator, collecting rings, a pair of main brushes for collecting direct current from said commutator, a third brush, pole pieces, a main field winding on said pole pieces, a regulating field winding disposed at right angles to said main field, the main field winding being connected across said third brush and one of said main brushes, the regulating field winding being connected across said main brushes, and a variable resistance in series with said main field circuit; of a transformer, a thermionic tube device using power supplied by said transformer and means for simultaneously connecting said transformer to the alternating potential generated by said generator, and shunting said resistance to strengthen the main field.

3. The combination with a generator comprising an armature, an alternating current winding on said armature, a direct current winding on said armature, a commutator, collecting rings, a pair of main brushes for collecting direct current from said commutator, a third brush, pole pieces, a main field winding on said pole pieces, a regulating field winding disposed at right angles to said main field winding, reluctance disposed in a portion of the magnetic flux in said regulating field, the main field winding being connected across said third brush and one of said main brushes, the regulating field winding being connected across said main brushes, and a variable resistance in series with said main field winding; of a transformer, a thermionic tube device using power supplied by said transformer, means for simultaneously connecting said transformer to the alternating potential generated by said generator, and shunting said resistance to strengthen the main field.

4. The combination, with a generator comprising an armature, slots in said armature, alternating current generating conductors disposed in the bottom of said slots, direct current generating conductors superposed on said alternating current conductors within said slots, a commutator, collecting rings, a pair of main brushes for collecting direct current from said commutator, a third brush, pole pieces, a main field winding on said pole pieces, a regulating field winding disposed at right angles to said main field, the main field winding being connected across said third brush and one of said main brushes, the regulating field winding being connected across said main brushes, and a variable resistance in series with said main field circuit; of a transformer, a thermionic tube device using power supplied by said transformer and means for simultaneously connecting said transformer to the alternating potential generated by said generator, and shunting said resistance to strengthen the main field.

5. The combination, with a constant potential generator having both alternating current and direct current windings on its armature, main brushes, a third brush, a regulatory flux-shifting cross field winding connected across the main brushes, a main field winding connected across the third brush and one of said main brushes, collecting rings for the alternating current component; of a transformer, a thermionic tube device for using power from said transformer and means for simultaneously connecting said transformer to said alternating current potential and increasing the strength of said main field.

6. The combination, with a vehicle, of a generator producing both direct current and alternating current components, of a transformer adapted to use the alternating current component, and means for strengthening the field of said generator when said transformer is connected in an external alternating circuit.

7. The combination, with an aeroplane, of a generator producing both direct current and alternating current components, of a transformer adapted to use the alternating current component, and means for automatically strengthening the field of said generator when said transformer is connected in an external alternating circuit.

In testimony whereof I affix my signature.

CARL E. CHESNEY.